Patented May 15, 1934

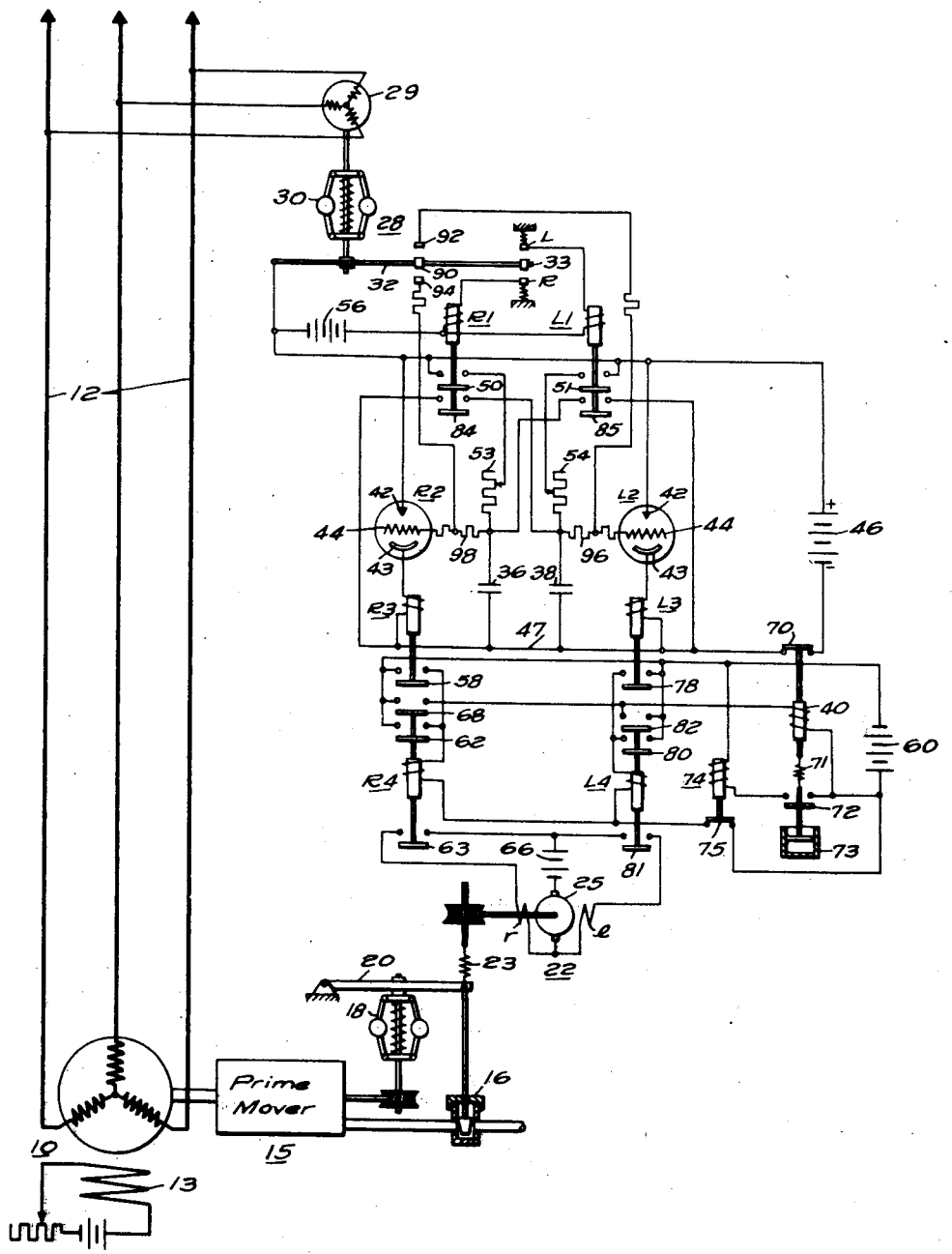

1,959,298

UNITED STATES PATENT OFFICE 1,959,298

REGULATING SYSTEM

Cyril C. Levy, Pittsburgh, and Renan De Camp, Wilkinsburg, Pa., assignors to Westinghouse Electric & Manufacturing Company, East Pittsburgh, Pa., a corporation of Pennsylvania Application August 5, 1933, Serial No. 683,884

16 Claims. (Cl. 171—119)

Our invention relates to regulating systems and it has particular relation to means for causing the corrective impulses produced by a regulator to be integrated before being translated into appropriate operations of a quantity-adjusting means which the regulator is disposed to control.

In many regulator applications it is difficult to convert the corrective impulses of the regulator into satisfactory response of the quantity-adjusting means controlled thereby. This difficulty is particularly pronounced when the regulator sensitivity materially differs from the response characteristics of the quantity-adjusting equipment upon which the corrective impulses act. The problem is also complicated by the fact that consecutive regulator impulses may be of opposite direction rather than successively the same.

In the past, attempts have been made to utilize mechanical means for the purpose of storing up or integrating the corrective impulses produced by the regulator before translating them into operating impulses for communication to the quantity-adjusting means. While theoretically such mechanical expedients may function properly, they are in practice, found to be unduly complicated and seriously limited as regards flexibility characteristics.

Our invention is directed to an improved solution of the problem stated which overcomes the disadvantages named and which possesses additional desirable features to be particularized hereinafter.

Generally stated, it is the object of our invention to provide means whereby a regulator having given response characteristics may satisfactorily control quantity-adjusting means having widely different response characteristics.

More specifically stated, one object of our invention is to provide, in combination with a regulator and quantity-adjusting equipment controlled thereby, means for causing corrective impulses produced by the regulator to be integrated and translated, when they have reached a predetermined summation value, into an operation of the quantity-adjusting means which continues for a predetermined length of time properly related to the impulse summation.

Another object of our invention is to provide impulse integrating means of the type described which appropriately take into account the direction of the regulator impulses in making the integration or summation thereof.

An additional object of our invention is to provide, in combination with integrating equipment of the type described, means whereby a predeterminedly large deviation in the regulated quantity will effect an operation of the quantity-adjusting means practically at once without the usual integration delay.

A further object of our invention is to provide an impulse integration system of the above-described character which is inherently capable of a wide range of adjustment and flexibility.

In practicing our invention, we utilize, for the purpose of integrating the regulator impulses, an electronic tube device having associated therewith control means in the form of a grid capacitor. This electronic tube assemblage is disposed intermediate the contact-member sets of the regulator and the quantity-adjusting means controlled thereby. Connections are made in such manner that the regulator impulses in each direction cause a unidirectional charging current to be impressed upon the grid capacitor of the associated electronic tube. When the grid potential resulting from this charging current rises to a given critical value, the tube is rendered conductive and thereby functions to initiate an appropriate corrective operation of the quantity-adjusting means. A suitable timing relay is provided to cause this corrective operation to continue for a period of time which is properly related to the integration of impulses which initiated it. In addition, these "raise" and "lower" integrating equipments are so interconnected that the direction of the regulator impulses is appropriately taken into account in the summation process.

As will be more completely explained, the system of our invention permits either a series of intermittent corrective impulses or an uninterrupted impulse from the regulator to charge the grid capacitor which is associated with each electronic tube to the critical value of potential at which the tube is rendered conductive. The grid capacitor potential is thus a function of the time during which the regulator contacts are closed and also depends upon the characteristics of the capacitor, the voltage of the charging source, and the resistance of the charging circuit. Because of the fact that changes may very readily be made in any one of these several elements, it is apparent that our summation system is inherently capable of a very broad flexibility.

Our invention itself will best be understood from the following description of a specific embodiment when taken in conjunction with the accompanying drawing, in which the single figure thereof is a diagrammatic view of apparatus and circuits arranged in accordance with a preferred embodiment of our invention shown as being disposed to integrate the corrective impulses supplied by a frequency regulator which controls the calibration of a prime mover governor.

Referring to the single figure of the drawing, an alternating-current circuit 12 is illustrated as being energized by a polyphase generator 10 which comprises armature windings directly connected with the circuit conductors and with an exciting field winding 13. The generator is driven by a prime mover 15 of the motive-fluid type having an input control valve 16, the opening of which is regulated by a speed responsive governing mechanism 18 which transmits control movements to a pivoted arm 20 by which the movable element of the valve 16 is actuated.

A speed-adjusting motor 22 of the reversible type serves to adjust the tension of a governor-calibrating spring 23 in a well known manner to effect corresponding changes in the speed of prime mover 15 and hence in the frequency of the voltage which generator 10 supplies to circuit 12. When the armature winding 25 of this motor is energized through field winding "r" the motor rotates in the frequency-raising direction, while when energized through field winding "l" it rotates in the opposite or frequency-lowering direction.

To control the energization of motor 22 in accordance with deviations from the desired value in the frequency of the voltage acting in circuit 12, a frequency regulator illustrated generally at 28 is utilized. As shown, this regulator comprises a synchronous motor 29 energized by the voltage acting in circuit 12, which drives a highly sensitive fly ball mechanism 30 to control the elevational position of a pivoted arm 32 which carries a contact member 33.

When the frequency is of the desired value, the contact carrying arm 32 occupies the neutral position indicated. A decrease in frequency lowers the speed of motor 29 and thereby causes contact member 33 to move downwardly into engagement with a cooperating member R. Similarly, an increase above the desired value in the frequency of the circuit voltage causes the regulator to bias contact member 33 upwardly into engagement with a second cooperating member L.

In the usual or elementary form of regulating system, the two actions just described would respectively effect, through suitable relay means, energization of frequency changing motor 22 in the frequency raising and frequency lowering directions, which energization would be substantially coincident with the regulator contact engagements.

While in certain situations such a simplified method of control is found adequate, in many others the results are highly unsatisfactory. For example, when the regulator 28 is exceedingly sensitive and the governor calibrating equipment controlled thereby is relatively sluggish in its response to the corrective impulses, this direct method of control cannot give satisfactory performance.

To overcome the disadvantages encountered in this and other comparable situations, the impulse integrating equipment of our invention has been devised for interposition between the regulator and the quantity adjusting means controlled thereby. In the embodiment of our invention illustrated in the drawing, such means comprise an electronic tube R2 and relay devices R1, R3 and R4 interposed between the "raise" contacts of regulator 28 and the frequency adjusting motor 22, and a similar electronic tube L2 and associated relays L1, L3 and L4 interposed between the "lower" contacts of the regulator and the motor 22. In addition, capacitors 36 and 38, respectively disposed in the grid control circuits of the two tubes named, and a suitable timing relay 40 are utilized in the impulse summation system shown.

Electronic tubes R2 and L2 are preferably of the grid-controlled gas-filled variety, each comprising an anode element 42, a cathode element 43 and a control grid element 44. As long as the potential of grid 44 is below a critical value, the tube functions as an insulator and passes no current from the anode to the cathode thereof. However, when the grid potential is raised to this critical value, a glow discharge is initiated between the grid and cathode of the tube which glow is immediately transferred to the anode 42. Upon the occasion of such a break down by tube R2 the resulting current passage effects the actuation of relay R3, while when tube L2 breaks down, relay L3 is similarly actuated.

To supply a suitable direct current energizing potential to the two electronic tubes named and to the relay circuits directly associated therewith, any suitable source of unidirectional voltage, such as a battery 46, may be utilized. The connections should be such that the tube anodes will be maintained at a positive potential with respect to the cathode elements. Interposed between the grid elements of the tubes and the cathode energizing conductor 47 are the capacitors 36 and 38 before named, which capacitors are respectively supplied with charging currents upon the actuation of relays R1 and L1, which complete charging circuits through their contact members 50 and 51, respectively. To control the magnitude of the charging currents, adjustable resistors 53 and 54 are included in the two circuits named.

As has been before mentioned, the integrating characteristics of the system of our invention are attained by charging the capacitors upon the closure of the regulator contacts. As soon as the capacitor voltage has been built up to the critical value of the associated electronic tube, which can result only after the charging circuit has been completed for a predetermined length of time, either continuously or intermittently, the tube is rendered conductive and effects an appropriate energization of the frequency changing motor 22. Once established, this energization continues for a given period of time, determined by means of time-delay relay 40, which period may be made such as to properly coordinate the response of the quantity adjusting means with the integrated regulator impulses which initiated it.

In operation of the complete integrating system of our invention, a decrease below the desired value in the frequency of the voltage acting in circuit 12 effects the engagement of regulator contact member 33 with cooperating member R, which completes, from a suitable energizing source shown as a battery 56, an energizing circuit for the actuating winding of relay R1.

The relay moves its contact members upwardly completing through member 50 a circuit for charging, from battery 46, the capacitor 36. Under the action of the charging current, which flows through resistor 53 into the capacitor, the voltage appearing across the device 36 is gradually built up. Upon the expiration of a given period of charging time which may be continuous, as is the case when the regulator contacts are continuously closed, or intermittent, which happens when the contact engagement is interrupted and reestablished, the capacitor voltage, which is impressed upon the grid element 44 of the electronic tube R2, reaches the critical value for the tube and causes to be established therein a glow discharge which renders the tube conductive.

The resulting current, supplied by battery 46, which flows from the anode 42 to the cathode 43 of tube R2 and through the actuating winding of relay R3, causes this relay to move its contact member 58 upwardly to complete, from a source of energization shown as a battery 60, a circuit which energizes the actuating winding of relay R4.

Relay R4 now moves its contact members upwardly, establishing through member 62 a holding-in circuit for the relay, and completing through member 63 a circuit for energizing, from a suitable source shown in the form of a battery 66, a governor-calibrating motor 22 in the frequency-raising direction. A third contact member 68 of relay R4 completes, from the battery 60, a circuit for energizing the actuating winding of time-delay relay 40.

Relay 40 immediately actuates contact member 70 upwardly interrupting thereby the circuit through which battery 46 energized electronic tube R2. This allows relay R3 to return to the unactuated position shown. Because of holding-in contact member 62, the energizing circuit for relay R4 is maintained and motor 22 continues to lower the frequency calibration of the prime mover governor. The motor energization continues until the time-delay relay 40 moves, through the medium of a tensional spring 71, a second contact member 72 upwardly, against the restraining action of a dashpot 73, to complete an energizing circuit for an auxiliary relay 74.

The resulting actuation of relay 74 effects, through contact member 75 thereof, an interruption of the energizing circuit for relay R4 with the result that this relay returns to the open contact position and thereby discontinues the energization of motor 22. In moving downwardly, contact member 68 of relay R4 interrupts the energizing circuit for time-delay relay 40 and allows the contact members of this relay to return to the downward position illustrated.

The frequency calibration of the prime mover governor has been appropriately corrected during the operation just described, and the several portions of the integrating equipment having all been returned to the normal positions, illustrated in the drawing, are accordingly ready to receive further impulses from the frequency regulator 28.

In the event that the frequency of circuit 12 rises above the desired value, regulator 28 causes contact member 33 to move upwardly into engagement with contact member L, thereby completing, from battery 56, an actuating circuit for relay L1. In moving contact member 51 upwardly, this relay completes, from battery 46, a circuit for charging capacitor 38, associated with electronic tube L2, which includes adjustable resistor 54.

After this charging circuit has been maintained, either continuously or interruptedly, for a predetermined total period of time the voltage of the capacitor, which is impressed upon the grid element 44 of tube L2, builds up to the value required to render tube L2 conductive. The resulting glow discharge in the tube causes it to conduct, from battery 46, a current which passes through the actuating winding of relay L3. In actuating contact member 78 upwardly, this relay completes, from battery 60, a circuit for energizing the actuating winding of relay L4.

Relay L4 accordingly moves its contact members upwardly, completing through member 80 a holding-in circuit and establishing through member 81 a circuit for energizing, from battery 66, the governor-calibrating motor 22 in the frequency-lowering direction. Contact member 82 of relay L4 also completes from battery 60 a circuit for energizing the actuating winding of time-delay relay 40.

As in the previous instance, relay 40 immediately effects, through contact member 70, an interruption of the energizing circuit of electronic tube L2 and causes, after a time-delay during which the operation of motor 22 continues, contact member 72 to complete a circuit for actuating auxiliary relay 74.

Relay 74 opens, as before, by means of contact member 75, the holding-in circuit of relay L4 and allows this relay, in returning to the open contact position illustrated, to discontinue the energization of motor 22 and also that of relay 40 which returns to the unactuated position illustrated. This return is followed by a reclosure of contact member 75 of relay 74. The equipment is now in a position to receive further impulses from the regulator, and, upon proper integration, to translate them into frequency-changing actuations.

The operations considered thus far have assumed either continuous closure of the regulator contact members or intermittent impulses therefrom, all in the same direction. In the event that consecutive impulses should be of opposite directions, it is desired that any accumulated capacitor charges in the opposite direction should be cancelled in order that the equipment may appropriately function during succeeding impulse productions by the regulator. To attain this feature, we provide relays R1 and L1 with auxiliary contact members, shown at 84 and 85, respectively, which are disposed to short circuit, upon closure, capacitors 38 and 36.

In the event that the regulator is supplying "raise" impulses, which result in the actuation of relay R1, each of these impulses causes contact member 84 to short circuit capacitor 38 associated with the "lower" control tube L2 and thereby reduce its charge to zero. In a similar manner each "lower" impulse by the regulator, in actuating relay L1, causes contact member 85 to short circuit capacitor 36 associated with the "raise" control tube R2, and thereby reduce its charge to zero. In this manner, the regulator impulses must all be in the same direction when a plurality are required to effect a break-down of the associated electronic tube, which is the condition to be desired.

In certain instances in which the magnitude of the deviation of the regulated quantity may be excessive, the delay incident to the integration of the impulses may be objectionable in spite of its merit during normal regulating conditions. In such cases, it is desirable to provide means whereby these excessive deviations may be caused to initiate operations of the quantity adjusting means without appreciable time delay.

The system of our invention disclosed in the drawing provides for this feature through the utilization of a second set of contact members in association with the regulator 28. Carried by the bar member 32 is a contact member 90, which, upon the occurrence of a predeterminedly large rise in the frequency, will engage with a stationary member 92 and upon the occasion of an excessively large fall in frequency will similarly engage with a stationary member 94. It will be understood that such engagement is always preceded by a closure of the normal-change responsive contact members 33 and L, or 33 and R, contact members L and R being resiliently mounted to allow further movement of the arm 32.

Engagement of contact members 90 and 92 completes, from battery 46, a circuit for impressing upon the grid element 44 of "lower" control electronic tube L2 a potential which, even though capacitor 38 may be at a low value of charge, is sufficiently high to render tube L2 conductive and thereby effect operation of motor 22 in the frequency-lowering direction. To attain this condition a section of resistor 96 may be interposed between capacitor 38 and the grid energizing circuit controlled by contact members 90 and 92.

In a similar manner, engagement of contact members 90 and 94, which results only upon an excessive drop in the circuit frequency, completes from battery 46, a circuit for impressing upon the grid element 44 of "raise" control tube R2, a potential which immediately renders the tube conductive, due to the presence of a resistor 98 between the grid circuit and capacitor 36. This at once results in an operation of frequency-changing motor 22 in the frequency-raising direction.

Considering again the normal integrating function of the system of our invention, it will be apparent that the flexibility of the equipment is exceedingly broad inasmuch as the time required for the capacitor associated with each of the electronic tubes to build up to the critical voltage of the tube may be varied by changing the capacity of the capacitor, varying the magnitude of the resistor disposed in the charging circuit, or by changing the magnitude of the potential which energizes the circuit. In addition to this, electronic tubes having different break down or critical grid potentials may also be utilized to extend the range of flexibility in the control of critical impulse integration.

Once an operation of the quantity adjusting means has been initiated, the length of this operation may likewise be varied over a wide range merely by changing the delay characteristics of timing relay 40 which may be any one of a number of types now well known and extensively applied in the electrical control art.

It will be apparent that while we have illustrated and explained the integrating system of our invention in combination with a frequency regulator disposed to control the governor calibration of a prime mover which drives an alternating current generator, the integrating system is in no way restricted to this particular application since it may be applied with equal success to any situation in which a regulator is arranged to control a quantity adjusting means.

Although we have shown and described a certain specific embodiment of our invention, we are fully aware that many modifications thereof are possible. Our invention therefore, is not to be restricted except insofar as is necessitated by the prior art and by the scope of the appended claims.

We claim as our invention:

1. The combination with a regulator and a quantity-adjusting means controlled thereby of electronic-tube means interposed between the regulator and the quantity-adjusting means for integrating the corrective impulses produced by the regulator before allowing them to initiate an operation of said adjusting means.

2. In combination, a regulator, a quantity-adjusting means controlled thereby, electronic-tube integrating means disposed between the regulator and the adjusting means to predeterminedly totalize the regulator impulses before allowing them to initiate an operation of the said adjusting means, and means for causing each operation of the adjusting means so initiated to continue for a predetermined period of time.

3. In combination, a regulator disposed to complete one circuit when a quantity which influences it deviates below a desired value and a second circuit when said quantity rises above said desired value, a quantity-adjusting means controlled by said two regulator circuits, electronic-tube integrating means disposed between the adjusting means and each of said circuits to predeterminedly totalize the regulator impulses before allowing them to initiate an operation of the said adjusting means, and means for causing a reversal in the direction of the regulator impulses to cancel any accumulated totalization of impulses of the original direction.

4. In combination, a regulating device, a quantity-adjusting means controlled thereby, electronic-tube integrating means disposed between the device and the adjusting means to totalize the device impulses before allowing them to initiate an operation of the said adjusting means, and means for permitting abnormally large deviation in the regulated quantity to directly initiate operations of the said quantity-adjusting means without the delay required for impulse integration.

5. In combination, a regulating device, a quantity-adjusting means controlled thereby, electronic-tube integrating means disposed between the device and the adjusting means to totalize the device impulses before allowing them to initiate an operation of the said adjusting means, timing means for causing each operation of the adjusting means so initiated to continue for a predetermined period of time, and means for permitting abnormally large deviations in the regulated quantity to directly initiate operations of the said quantity-adjusting means.

6. In combination, a quantity-adjusting means, a regulator for controlling said adjusting means by selectively completing "raise" and "lower" operation-initiating circuits, electronic-tube integrating means disposed between the adjusting means and each of said circuits to totalize the regulator impulses before allowing them to initiate adjusting-means operations, timing means for causing each operation of the adjusting means so initiated to continue for a predetermined period, and means for permitting abnormally large deviations in the regulated quantity to directly initiate operations of the said quantity-adjusting means without the delay required for impulse integration.

7. A regulating system comprising, in combination, a device disposed to supply corrective impulses in accordance with deviations in a quantity from a desired value, means for adjusting the magnitude of said quantity, and means including an electric discharge device for effecting the operation of said quantity-adjusting means in accordance with the integrated impulses supplied by said device.

8. In combination, a regulator, means for influencing said regulator by a quantity to be maintained constant, means for adjusting the magnitude of said quantity, and means including an electric discharge device and a capacitor for initiating an operation of said quantity-adjusting means when the duration of deviation, in a given direction, from a desired value of said regulated quantity accumulates to a predetermined total period.

9. In a regulating system, the combination of a contact-making device influenced by a quantity to be maintained constant, means for adjusting the magnitude of said quantity, an electric-discharge tube for controlling the operation of said adjusting means, a capacitor associated with said discharge tube, and means controlled by the contact-making device for charging said capacitor with a uni-directional current when the regulated quantity deviates from a desired value, said capacitor being disposed to cause the said discharge tube to function when the capacitor has been subjected to the charging current for a given total period of time.

10. In a regulating system, the combination of a contact-making device influenced by a quantity to be maintained constant, means for adjusting the magnitude of said quantity, an electric-discharge tube for controlling the operation of said adjusting means, a capacitor associated with said discharge tube in a manner to cause it to function when the capacitor potential attains a given value, and means controlled by the contact-making device for impressing upon said capacitor a uni-directional charging current.

11. In combination with a regulator and a quantity-adjusting means, an electronic tube for controlling the operation of said adjusting means, a capacitor disposed to control said tube, means for charging said capacitor with uni-directional current whenever the regulator supplies a corrective impulse in a given direction, means for causing said tube to initiate an operation of said adjusting means when the capacitor potential has been built up to a given value, and means for causing each operation of the adjusting means so initiated to continue for a predetermined period of time.

12. In combination, a quantity-adjusting means, an electronic tube for initiating an operation of said means in the "raise" direction and a second tube for initiating operation thereof in the "lower" direction, a capacitor disposed to control each of said tubes, a regulator, means controlled by the quantity-change impulses provided by the regulator for selectively supplying to said capacitors a uni-directional charging current, and means for causing each of said tubes to initiate an operation of said adjusting means when the potential of the associated capacitor attains a given value.

13. In combination, a quantity-adjusting means, an electronic tube for initiating an operation of said means in the "raise" direction and a second tube for initiating operation thereof in the "lower" direction, a capacitor disposed to control each of said tubes, a regulator, means controlled by the quantity-change impulses provided by the regulator for selectively supplying to said capacitors a uni-directional charging current, means for causing each of said tubes to initiate an operation of said adjusting means when the potential of the associated capacitor attains a given value, and means for causing each charging impulse supplied to each of said capacitors to be accompanied by the establishment of a shunt circuit around the other capacitor to effect a discharge thereof.

14. In combination, a quantity-adjusting means, an electronic tube disposed to initiate operation of said adjusting means, a capacitor disposed to control said tube, a regulator, means controlled by said regulator for supplying to said capacitor a uni-directional charging current, means for causing said electronic tube to function when the potential of said capacitor reaches a given value, and means, comprising a timing relay, for causing each operation of the adjusting means so initiated to continue for a predetermined period.

15. In combination, a quantity-adjusting means, an electronic tube disposed to initiate operation of said adjusting means, a capacitor disposed to control said tube, a regulator, means controlled by said regulator for supplying to said capacitor a uni-directional charging current, means for causing said electronic tube to function when the potential of said capacitor reaches a given value, and means, associated with said regulator, for causing abnormally large deviations in the regulated quantity to directly influence the tube to cause it to function without the delay required to charge the capacitor.

16. In combination, a quantity-adjusting means, an electronic tube disposed to initiate operation of said adjusting means, a capacitor disposed to control said tube, a regulator, means controlled by said regulator for supplying to said capacitor a uni-directional charging current, means for causing said electronic tube to function when the potential of said capacitor reaches a given value, a timing relay disposed to cause each operation of the adjusting means so initiated to continue for a predetermined period, and means for causing abnormally large deviations in the regulated quantity to directly influence said tube to cause it to function without the delay required for the capacitor to be properly charged.

CYRIL C. LEVY.
RENAN DE CAMP.